United States Patent [19]

Therkelsen

[11] 3,985,047
[45] Oct. 12, 1976

[54] WINCH DRIVE MECHANISM
[75] Inventor: Hans Richard Therkelsen, Delta, Canada
[73] Assignee: Mercury Winch Manufacturing Ltd., Canada
[22] Filed: Nov. 4, 1974
[21] Appl. No.: 520,476

[52] U.S. Cl. .............................................. 74/805
[51] Int. Cl.² ......................................... F16H 5/52
[58] Field of Search........... 74/804, 805; 254/180 R, 254/150 R

[56] References Cited
UNITED STATES PATENTS

| | | | |
|---|---|---|---|
| 1,634,453 | 7/1927 | Carroll | 74/805 |
| 1,770,468 | 7/1930 | Ford | 74/805 |
| 2,083,954 | 6/1937 | Kessler | 254/186 R |
| 3,184,018 | 5/1965 | Christison | 254/186 R X |
| 3,391,907 | 7/1968 | Vogelsang | 254/150 R |
| 3,494,595 | 2/1970 | Bohan | 254/186 R |
| 3,710,635 | 1/1973 | Whitehorn | 74/805 X |
| 3,771,766 | 11/1973 | Pillsbury, Jr. | 254/150 R |

*Primary Examiner*—Samuel Scott
*Assistant Examiner*—Frank H. McKenzie, Jr.
*Attorney, Agent, or Firm*—Robert W. Beach

[57] ABSTRACT

An electric drive motor drives a chain and sprocket speed reducer which, in turn, drives a gyratory speed reducer connected by an overrunning clutch to the winch drum. A pawl of the overrunning clutch is automatically controlled by rotation of the gyratory speed reducer in the drum winding direction to engage the pawl for effecting positive drive of the clutch. Another pawl is spring pressed to effect positive drive of the clutch when the drive means are rotated in the opposite direction to turn the winch drum in the unwinding direction. When the drum is turned in the unwinding direction by pulling out line from the drum, the clutch overruns but provides a drag to prevent freewheeling of the drum. A brake for restraining unwinding rotation of the winch drum under load can be slipped by reversing the rotation of the drive motor to control unwinding rotation of the drum.

8 Claims, 12 Drawing Figures

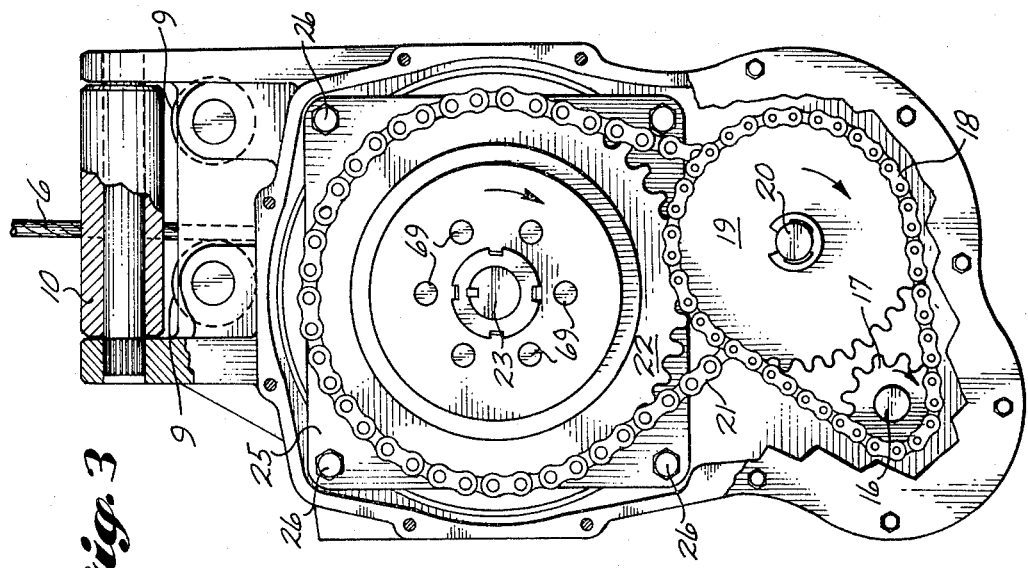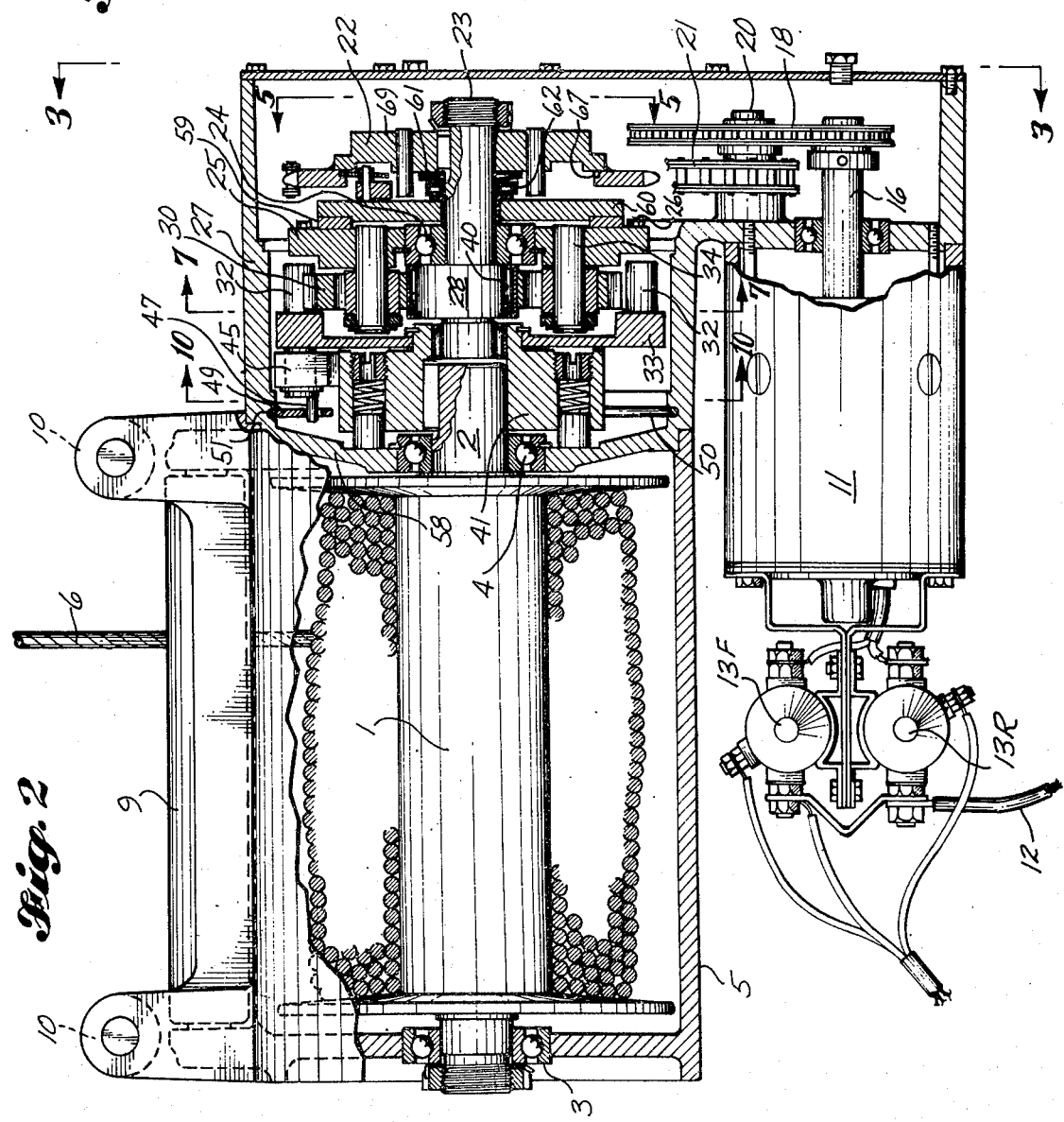

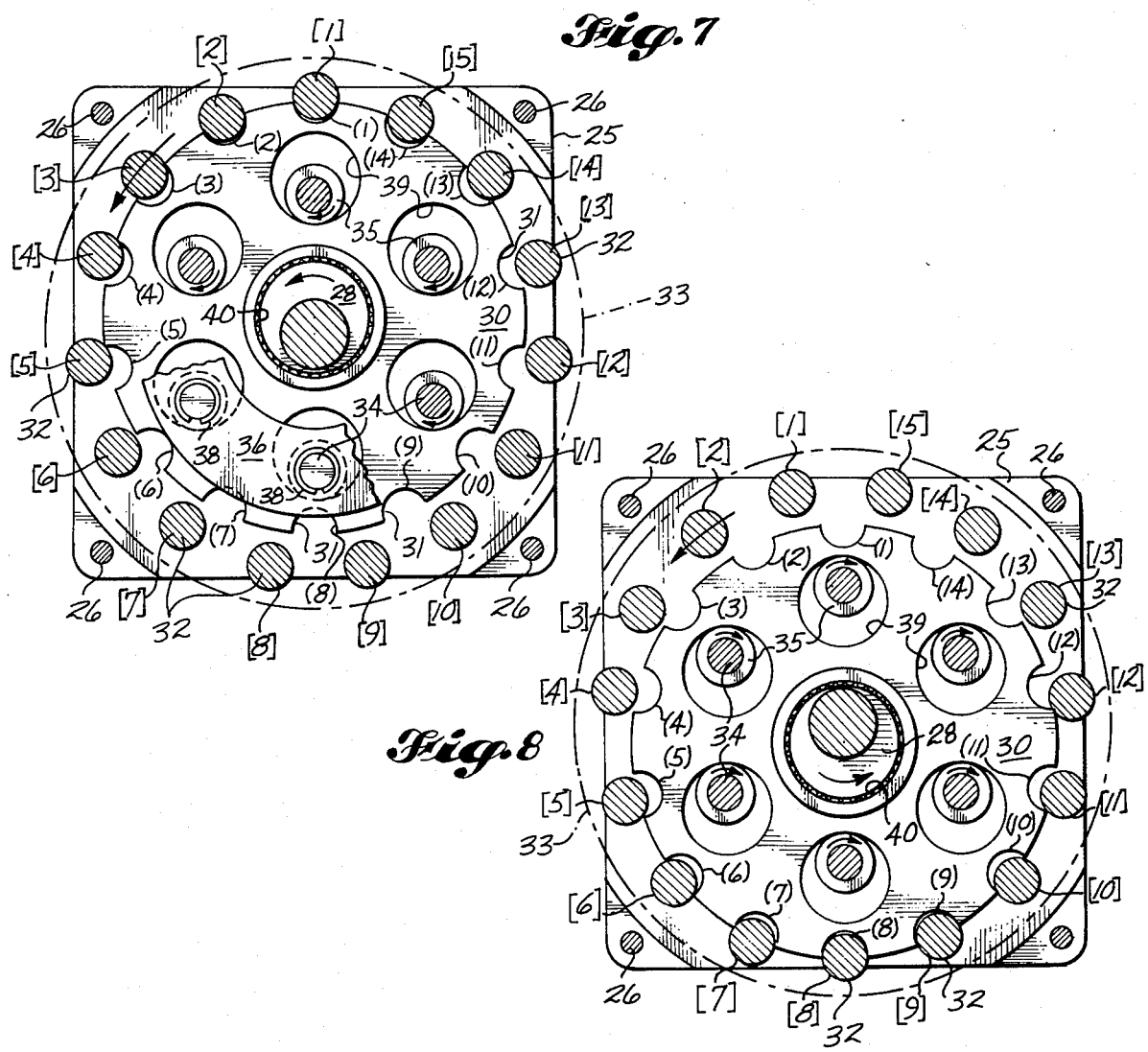

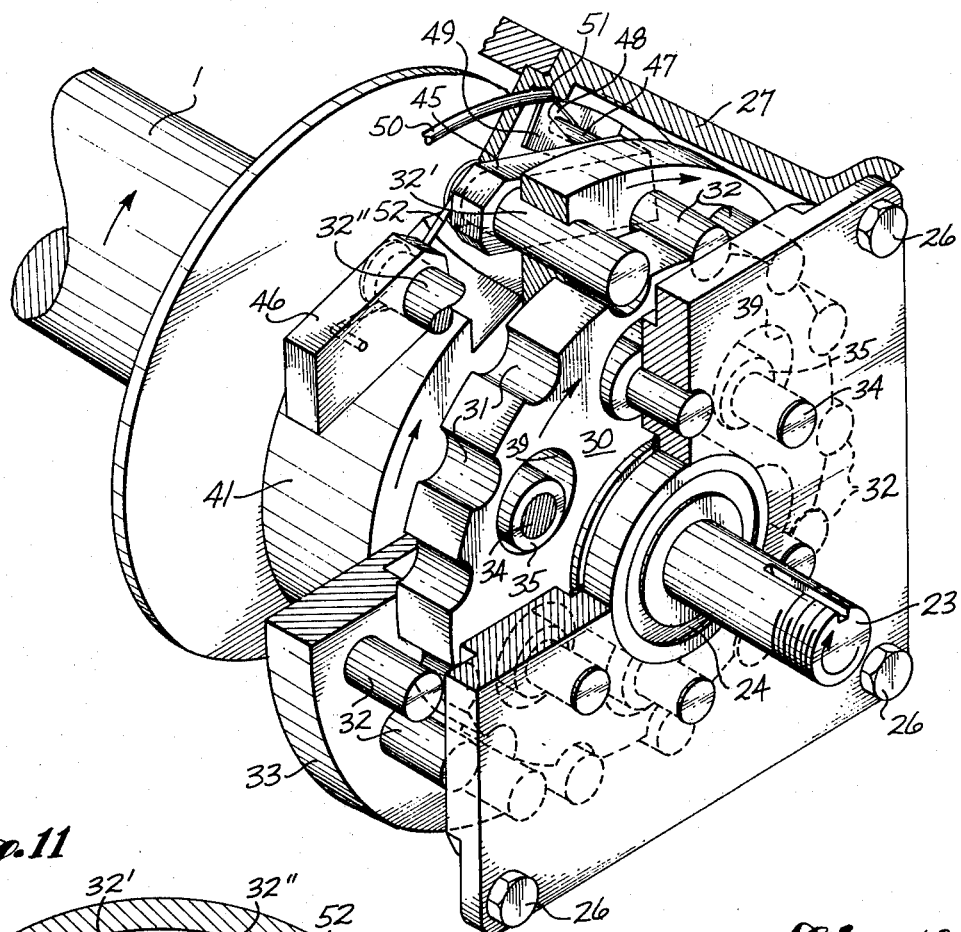
Fig. 9
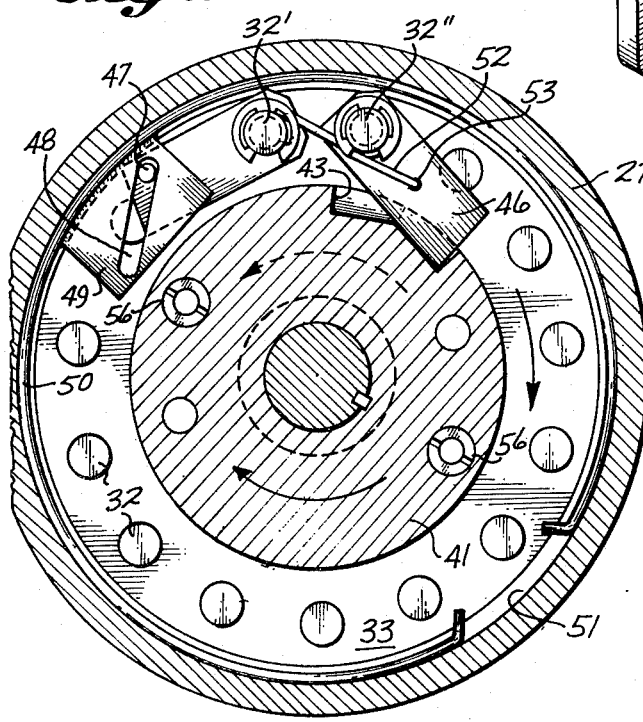
Fig. 11
Fig. 10

WINCH DRIVE MECHANISM

This invention relates to winch drives intended particularly for small, powerful power winches.

A principal object is to provide such a winch including a drum having a high speed reduction ratio between the driving motor and the drum without utilization of reduction gearing.

A further object is to provide a positive speed reducer which is economical to construct and does not require excessively close tolerances.

It is also an object to provide a winch which is compact, while being of rugged construction and light for its power capability.

An additional object is to provide a winch which is simple and easy to operate for controlling the winch drum to rotate either in the winding direction or in the unwinding direction under load.

FIG. 2 is a plan of the winch with parts broken away to show internal structure, and FIG. 3 is an end elevation of the winch with a casing cover removed and parts broken away, as viewed from line 3—3 of FIG. 2.

FIG. 7 is a section through the winch mechanism taken on line 7—7 of FIG. 2, and FIG. 8 is a similar view showing parts in different positions.

FIG. 9 is a top perspective of another portion of the drive mechanism with parts broken away.

FIG. 10 is a fragmentary section through the drive mechanism of FIG. 9, taken on line 10—10 of FIG. 2, and FIG. 11 is a similar view with parts in different positions.

Figure 1:
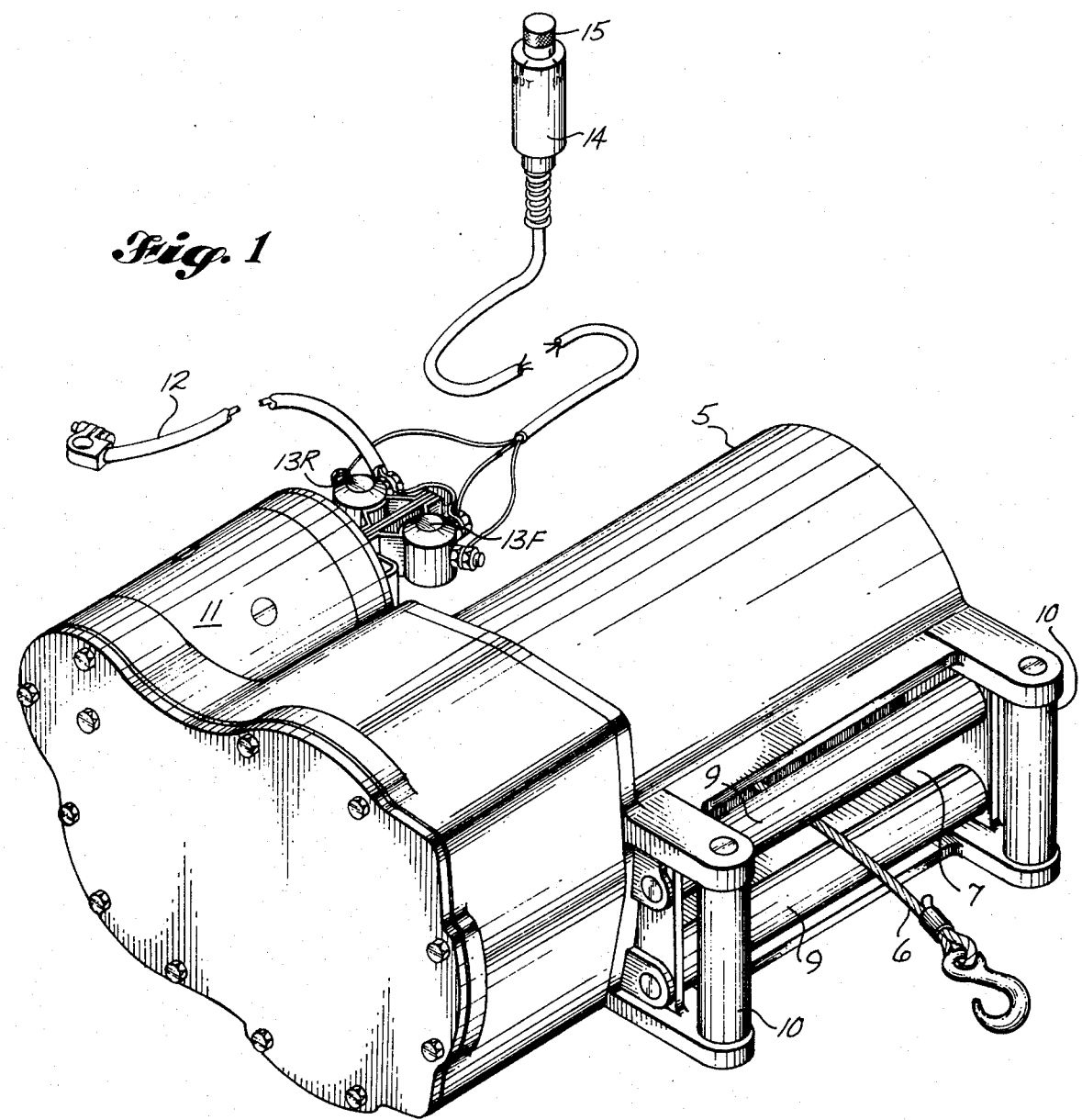
FIG. 1 is a top perspective of the complete winch and its controls.
Figure 4:
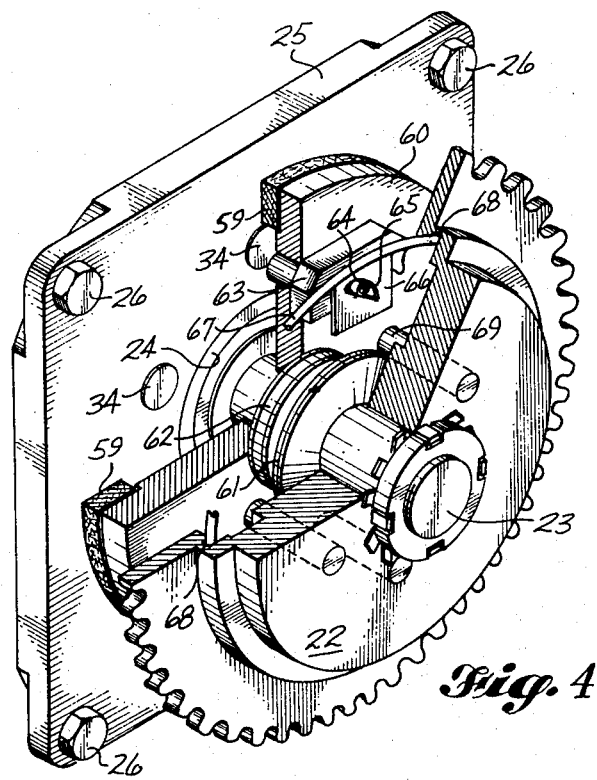
FIG. 4 is a top perspective of a portion of the driving mechanism.

The winch drum 1 mounted on the axle 2 rotating in antifriction bearings 3 and 4 is completely enclosed in the housing 5. The line 6 wound on the drum 1 extends from the drum through a slot 7 in the housing and passes between fairlead rollers 9 rotating about axes parallel to the winch drum axle 2 and between fairlead rollers 10 extending perpendicular to the fairlead rollers 9. The drive mechanism for the winch drum 1 is driven by an electric motor 11, which may be similar to an automobile starting motor, having high torque characteristics. Such motor is of the direct-current type, being powered by a storage battery to which a lead 12 is connected.

Such storage battery is electrically connected to a motor 11 by a solenoid switch 13F to effect energization of the motor for producing winding rotation of the drum or the solenoid 13R to effect energization of the motor for producing powered unwinding of the drum. Energization of the solenoid 13F or the solenoid 13R is effected by a remote control 14 having a knob 15 rotatable in one direction to select the circuit for solenoid switch 13F and rotatable in the opposite direction to select the circuit for energization of solenoid 13R. After the selector knob 15 has been turned into the proper selected position, it can be pushed inward to complete the circuit for energizing the selected solenoid switch.

The shaft 16 of the motor 11 is connected by a two-stage chain and sprocket speed reducer to the main speed reducer of the winch drum drive. As shown in FIG. 3, a sprocket 17 mounted on motor shaft 16 drives chain 18 which in turn rotates the large sprocket 19. Such large sprocket is mounted on shaft 20 on which the small sprocket of the second stage reduction is also mounted. Such small sprocket drives the chain 21 for turning sprocket 22 keyed to sprocket shaft 23. Such sprocket shaft is aligned with the drum shaft 2.

The shaft 23 is supported primarily by an antifriction bearing 24 mounted in a stationary plate 25. This plate is secured by cap bolts 26 to the speed reducer casing 27. On the end of shaft 23 at the side of plate 25 opposite the sprocket 22 is mounted an eccentric 28 received in a central aperture 29 of a circular socket disk 30, shown best in FIGS. 7, 8, 9 and 12. Concave sockets 31 of substantially semicylindrical shape are spaced circumferentially around the periphery of the socket disk.

Each socket is of a size and shape complemental to pegs 32 projecting axially from a peg disk 33. Such peg disk is of larger diameter than the diameter of the socket disk 30 and is positioned so that the circle of the row of pegs 32 is concentric with the axis of shaft 23 on which the eccentric 28 is mounted and also concentric with the axis of the winch drum shaft 2. As shown in FIGS. 7 and 8, the diameter of the peg row circle is sufficiently larger than the diameter of the socket row circle so that when a socket 31 is engaged with a peg 32 at one side of the peg and socket circles, the socket 31 diametrically opposite such engaged sockets will be spaced from the pegs of the peg row.

FIGS. 7 and 8 illustrate two representative relationships of the socket disk and the peg disk. The number of pegs in the annular peg row will be slightly different from the number of sockets in the annular socket row. For the greatest speed reduction effect of the gyratory drive in which the socket disk and peg disk are included, the difference between the number of pegs and the number of sockets should be one. In the mechanism illustrated there is one more peg than sockets. There are fifteen pegs equally spaced circumferentially around the circular peg row, and there are fourteen sockets equally spaced around the periphery of th socket disk 30.

The speed reduction of the gyratory mechanism is accomplished by driving one of the disks in gyratory fashion to rotate the other disk by peg and socket engagement. In the mechanism illustrated, the socket disk 30 is moved in gyratory fashion by the eccentric 28 so that the engagement of the sockets 31 with the pegs 32 rotates the peg disk 33 around the axis of shaft 23 mounting the eccentric 28 and the axis of the winch drum shaft 2. To restrict the socket disk 30 to gyratory movement, the rotation of such disk is restrained by cantilever rods 34 having their root ends fixed in apertures of the stationary plate 25.

Figure 12:
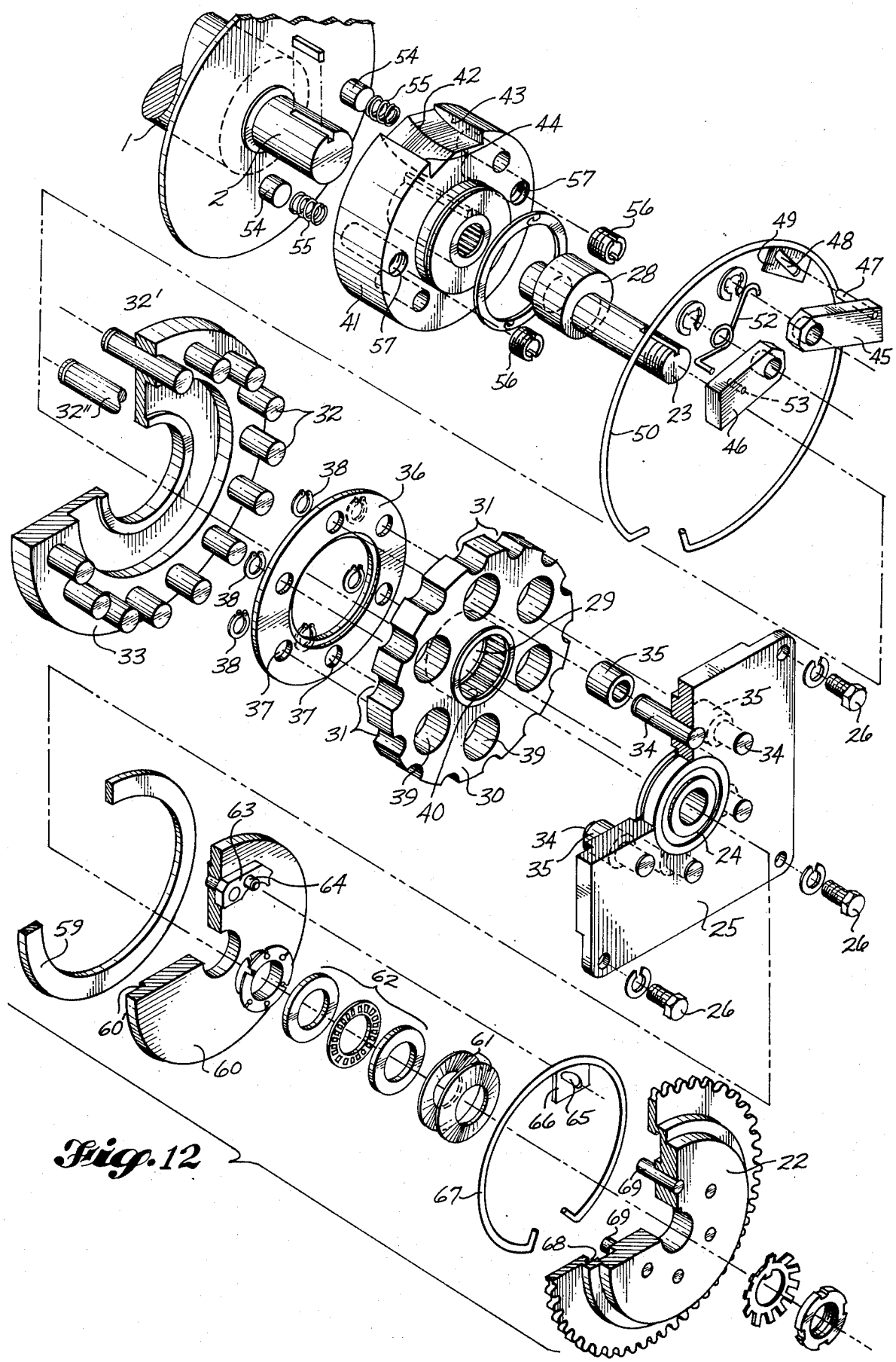
FIG. 12 is a top perspective view of the principal portion of the winch drive mechanism, showing the parts in exploded relationship.

Collars 35 are fitted on the projecting ends of the rods 34, and these collars are held in place by the retaining ring 36 shown in FIGS. 7 and 12 and having circumferentially spaced apertures 37 that fit over the projecting end of the rods 34. The retaining ring is held in place by snap rings 38 fitting in grooves in the ends of the rods 34. The collars 35 are received loosely in much larger apertures 39 in socket disk 30 arranged in a circle and spaced circumferentially.

When the shaft 23 is rotated the eccentric fitted in the central aperture 29 of socket disk 30 will rotate relative to such disk because that disk is restrained from appreciable rotation by the rods 34. An antifriction bearing 40 is engaged between the disk aperture and the eccentric. Rotation of the eccentric will effect gyration of the socket disk 30 relative to the peg disk 33, so that the sockets and pegs will engage with each other progressively circumferentially of the socket disk as the eccentric rotates. When the solenoid switch 13F is energized, the motor 11 will be operated to turn shaft 16 in the clockwise direction as seen in FIG. 3. Such rotation of the motor shaft will effect corresponding clockwise rotation of the sprocket 19, sprocket 22 and eccentric drive shaft 23.

The sections of FIGS. 7 and 8 view the gyratory drive in the direction opposite the direction in which FIG. 3 is viewed. Consequently, in FIGS. 7 and 8 the eccentric 28 and the peg disk 33 are shown as being rotated in the counterclockwise direction, but illustrate rotational movement corresponding to the clockwise arrows of FIG. 3. In FIG. 7 the pegs 32 are numbered [1] to [15] in counterclockwise sequence, and the sockets 31 are numbered (1) to (14) in counterclockwise sequence.

When the eccentric 28 is in the position shown in FIG. 7, it will raise socket disk 30 to its highest position so that socket (1) engages peg [1] most closely. Socket (2) will be generally in alignment with peg [2], and socket (14) will be generally in alignment with peg [15]. Socket (3) will be somewhat less in alignment with peg [3], and socket (13) will be somewhat less in alignment with peg [14]. The correlation between the sockets and pegs decreases progressively toward the sides of the socket disk and peg disk diametrically opposite the socket (1) and peg [1] until at such diametrically opposite sides the socket (8) is located midway between the pegs [8] and [9].

As the eccentric 28 is turned by shaft 23 in the counterclockwise direction as indicated in FIG. 7, the position of closest approach of the socket disk to the circle of pegs will progress in a counterclockwise direction until the parts reach the relationship shown in FIG. 8. The eccentric is shown to have rotated through one-half a revolution between the position of FIG. 7 and that of FIG. 8. During such rotation the socket (2) will engage peg [2], socket (3) will engage peg [3], socket (4) will engage peg [4], and so on, in sequence progressively in the counterclockwise direction. Because there are fewer sockets than there are pegs, the peg disk will be moved incrementally in the clockwise direction each time a socket is engaged with a peg.

In the position of FIG. 8 the socket (8) is engaged with the peg [8]. Such socket (8) is diametrically opposite the socket (1), whereas the peg [8] is not quite diametrically opposite the peg [1]. On the contrary, by such revolution of the eccentric, the peg [8] has been displaced circumferentially one-half of a pitch distance of the pegs between the position of FIG. 7 and the position of FIG. 8. When the eccentric 28 has completed the next half revolution, the socket (1) will be engaged with the peg [15] at the top of the peg and socket circles so that, during such single revolution of the eccentric, the peg [1], and consequently the peg disk 33, will have been turned through a distance equal to the pitch of the pegs in the peg circle.

For purposes of illustration, fifteen pegs have been provided. Consequently, these pegs are spaced apart angularly 24°. For each revolution of the eccentric 28 the peg disk 33 will make one revolution in the same direction so that the speed reduction between shaft 23 and the peg disk 33 is 15 to 1. This reduced speed of the gyratory drive is transmitted to the shaft 2 of the drum 1 through an overrunning clutch.

The overrunning clutch includes a collar 41 having a recess 42 in its periphery providing opposing shoulders 43 and 44. Two of the pegs 32, designated 32' and 32", project axially beyond the side of the peg disk 33 remote from the socket disk 30. A pawl 45 is pivotally mounted on peg extension 32' to swing into and out of recess 42 for pushing engagement with shoulder 43. A second pawl 46 is pivotally mounted on peg extension 32' to swing into and out of recess 42 for abutment of its end with shoulder 44.

A control pin 47 projects from the side of pawl 45 remote from peg disk 33 into an inclined control slot 48 in a control plate 49, shown best in FIGS. 2, 10 and 11. This control plate is carried by a slipping friction ring 50 fitting into a groove 51 in the speed reducer casing 27. A helical torsion spring 52 having its helix encircling the peg extension 32" has a bent end fitted into a hole 53 in the pawl 46, urging such pawl toward the collar 41.

As the peg disk 33 is rotated slowly in the clockwise direction as seen in FIG. 9, the friction ring 50 initially will be held stationary by the friction between it and groove 51. Consequently, the peg extension 32' moved arcuately by rotation of the peg disk 33 will slide the pawl pin 47 inwardly along slot 48 until the swinging end of the pawl engages the shoulder 43 of the recess 42 in collar 41. The rotation of the peg disk 33 will then be transmitted positively through the pawl 45 and collar shoulder 43 to the collar 41 keyed to the winch drum shaft 2. As long as motor 11 drives shaft 23 in the clockwise direction through the chain and sprocket speed reducer, the gyratory speed reducer including socket disk 30 and peg disk 33 will rotate collar 41 and winch shaft 2 steadily at slow speed in the drum winding direction.

If pressure on the switch knob 15 is released and such knob is swung from the "in" position of FIG. 1 to the "out" position of that figure and then pushed, the solenoid switch 13F will be deenergized and the solenoid switch 13R will be energized to effect rotation of the drive motor in the opposite direction. Such opposite rotation of the drive motor will reverse the direction of rotation of shaft 16 and speed reducer sprockets 17, 19 and 22, so that they will be rotated in the counterclockwise direction, instead of in the clockwise direction indicated in FIG. 3. Correspondingly the peg disk 33 will be rotated slowly in the counterclockwise direction as seen in FIG. 9.

Reversal of the rotation of peg disk 33 will move peg extension 32' correspondingly in the counterclockwise direction as seen in FIG. 9. If there is no appreciable load on pawl 45, pin 47 will slide outward along inclined slot 48 of control plate 49 because of the frictional resistance to rotation of the friction ring 50. By such outward movement of pin 47 pawl 45 will be swung from the position shown in FIG. 10 outward to the position shown in FIG. 11, clear of the collar 41. Continued rotation of the peg disk in the counterclockwise direction will then cause the pin 47 engaged in the slot 48 of plate 49 to drag the friction ring 50 in the counterclockwise direction, as seen in FIG. 11.

Because pawl 46 is always pressed by spring 52 into engagement with collar 4, the swinging end of such pawl will slide into the recess 42 of the collar 41 when the pawl reaches such recess, and its end will abut against the shoulder 44. By such engagement the collar 41 and, in turn, the winch shaft 2 to which it is keyed will be turned positively in the unwinding direction as long as the motor 11 remains energized.

If the motor control knob 15 is released and turned to the off position indicated in FIG. 1 after the motor 11 has been operated in reverse to turn the speed reducers in the manner described, the speed reducers will then simply remain stationary. If there is no appreciable load on the line 6 when the motor 11 is stopped and the line is pulled to exert an unwinding torque on the drum 1, the collar 41 will be turned in the counterclockwise direction as seen in FIG. 9 which is the clockwise direction indicated by the broken-line arrow in FIG. 10. Since the reverse drive of motor 11 and the speed reducers will effect swinging of the pawl 45 into the outer position shown in FIG. 11, such clockwise rotation of the collar will simply cause the pawl 46 to ratchet as line is paid out during the unwinding rotation of the drum.

It is undesirable for the drum to rotate in free-wheeling fashion as the line is pulled out. Consequently, a drag is provided for the collar 41 in the form of plungers 54 of friction material, backed by springs 55 and retaining screws 56 received in axial bores 57 in the collar 41. The springs 55 press such plungers into frictional engagement with the end wall 58 (FIG. 2) of the speed reducer casing adjacent to the drum. The degree of restraint provided by the drag plungers 54 can be regulated to some degree by the extent to which the screws 56 are screwed into the bores 57 and by the number of drag plungers utilized.

It is desirable for the winch to have the capability of holding a load reliably in any raised position and also of lowering such a load in controlled fashion. The drag provided by the plungers 54 would be totally inadequate to control lowering of a heavy load. The winch drum will remain stationary when the motor is stopped because the load on line 6 tending to rotate the collar 41 in the clockwise direction, as seen in FIG. 10, will press the shoulder 43 against the end of pawl 45 to hold that pawl engaged with the shoulder. Such pressure will be transmitted through the pawl to the peg extension 32' which will tend to rotate the peg disk 33. Since a peg of this disk is engaged with a socket 31 of socket disk 30, torque will be exerted on that disk. To prevent the socket disk 30 from being rotated by the peg disk 33, a brake is provided which will be activated when the winch drum is turned through a small angle in the unwinding direction by reverse operation of the motor 11. Such brake includes the brake ring 59 of friction material which fits over the annular shoulder 60' of brake disk 60. This brake disk is received between the sprocket 22 and the stationary plate 25 as seen best in FIGS. 2 and 4 to 6, inclusive. The side of the brake ring 59 opposite the disk 60 will bear against the stationary plate 25 by pressure of Belleville springs 61 pressing against an antifriction thrust bearing 62.

In order to activate the brake when the motor 11 is being driven in reverse while leaving the brake free when the motor is being driven in the forward direction, brake control mechanism is provided which includes the pawl 63 pivoted on the disk 60. A pin 64 projecting from the pawl is engaged in an inclined control slot 65 in plate 66 carried by a slipping friction spring ring 67. This spring ring fits in a groove 68 in a recess in sprocket 22. The swinging end of the pawl 63 is engageable with any one of several pins 69 projecting axially from sprocket 22 toward the brake disk 60.

Figure 5:
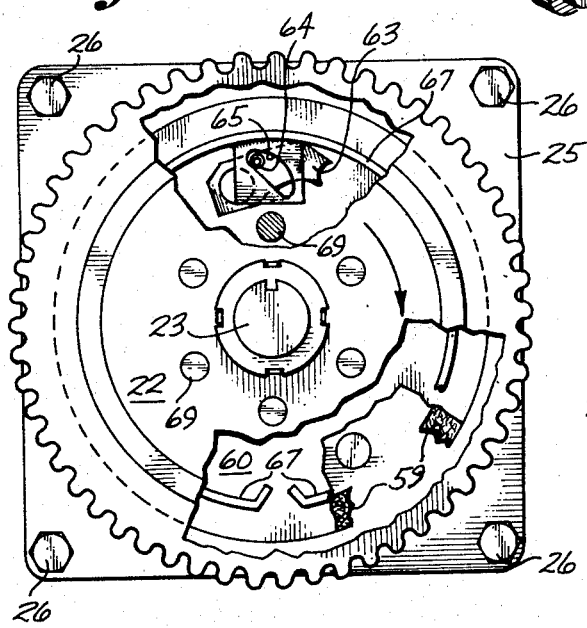
FIG. 5 is a sectional view of such mechanism seen from line 5—5 of FIG. 2 and having parts broken away.

When the motor 11 is turning in the forward direction to rotate the drum 1 in the winding direction, the speed reducer sprocket 22 will be turning in the clockwise direction as discussed in connection with FIG. 3 and as shown in FIG. 5. Such rotation will turn slipping friction ring 67 also in the clockwise direction. Consequently, plate 66 will be moved in the clockwise direction relative to the brake disk 60 which the brake ring 59 tends to hold stationary. Inclined slot 65 in plate 66 will therefore wedge pawl pin 64 outward to swing pawl 63 into the outer position shown in FIG. 5, in which it will be clear of the pins 69.

The frictional resistance of brake ring 58 is much greater than the frictional resistance of friction ring 67 in groove 68. Consequently, as sprocket 22 is turned, its groove 68 will slip with reference to ring 67 rather than the force on such ring being sufficient when transmitted through the slot 65 of plate 66 and the pin 64 of pawl 63 to turn the brake disk 60. As long as the sprocket 22 is rotated in the clockwise direction as seen in FIGS. 3 and 5, therefore, or is stationary, the pawl 63 will remain in the position shown in FIG. 5 and the brake disk 60 will remain nonrotative.

Figure 6:
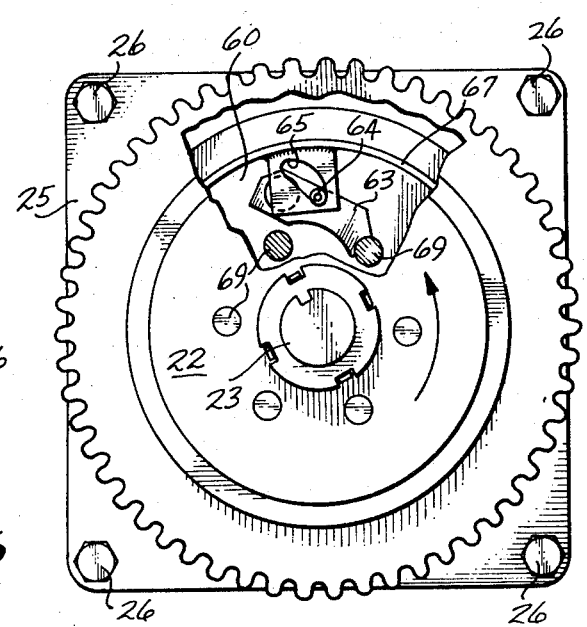
FIG. 6 is a similar view showing parts in different positions.

If the motor 11 is operated in reverse to turn sprocket 22 in the counterclockwise direction as seen in FIG. 3 and in FIGS. 5 and 6, such rotation of the sprocket will move friction ring 67 in the counterclockwise direction initially. Since brake ring 59 will still be holding brake disk 60 stationary, the control slot 65 of plate 66 will wedge pawl pin 64 inwardly to swing pawl 63 from its position of FIG. 5 to the position of FIG. 6.

In the FIG. 6 position, the inner end of the pawl will be in the path of rotation of the circular row of pins 69. Consequently, the next pin which approaches the pawl will abut the pawl end as shown in FIG. 6 to exert on the pawl a thrust that will turn brake disk 60 in the counterclockwise direction in synchronism with the sprocket 22. Any tendency of a load being lowered to turn the sprocket 22 in the counterclockwise direction will therefore be resisted by the brake ring 59 so that such sprocket will not rotate unless it is driven positively in the counterclockwise direction by powered reverse rotation of motor 11. When the lowering operation of the winch under load has been completed, the motor 11 can again be energized to turn in the forward direction to swing the brake control pawl back from the position of FIG. 6 to that of FIG. 5 in the manner described above.

I claim:

1. Drive mechanism comprising a stationary member, a first rotatable member rotatable relative to said stationary member, a second rotatable member rotatable relative to said stationary member about the same axis, and means for connecting said second rotatable member to said first rotatable member for conjoint rotation including a pawl carried by said first rotatable member and swingable relative thereto for engagement with said second rotatable member and friction control means engageable between said pawl and said stationary member, rotatable conjointly with said first rotatable member and operable to swing said pawl relative to said first rotatable member into engagement with said second rotatable member.

2. The drive mechanism defined in claim 1, in which the friction control means includes a friction member rotatable relative to the stationary member and frictionally engaged therewith and cam means connected between said friction member and the pawl and operated by relative rotation of the first rotatable member and the friction member to swing the pawl positively into driving engagement with the second rotatable member.

3. The drive mechanism defined in claim 2, in which the cam means includes a pin carried by the pawl at a location spaced from its axis of swing and the friction member has a slot inclined relative to the axis about which the pawl is swingable and engaging said pin for exerting a wedging action thereon to swing the pawl about its axis relative to the second rotatable member.

4. Drive mechanism for a winch drum comprising a stationary member, a rotatable member rotatable relative to said stationary member and connected to the winch drum, and drag means carried by said rotatable member and engageable with said stationary member for producing a friction force opposing rotation of said rotatable member relative to said stationary member.

5. The drive mechanism defined in claim 4, in which the drag means includes a plurality of plungers carried by the rotatable member and spring pressed into engagement with the stationary member.

6. Drive mechanism comprising a stationary member, a rotatable member rotatable relative to said stationary member, drive means for driving said rotatable member relative to said stationary member, brake means engageable between said rotatable member and said stationary member, and brake-actuating means for releasing said brake means automatically in response to rotation of said rotatable member relative to said stationary member in one direction by said drive means and for applying said brake means when said rotatable member is driven in the opposive direction relative to said stationary member by said drive means.

7. The drive mechanism defined in claim 6, in which the rotatable member is a rotatable drive member, the brake means includes a friction brake member rotatable relative to the stationary member, and the brake-actuating means includes connecting means for connecting said rotatable drive member and said rotatable friction brake member for conjoint rotation relative to the stationary member.

8. The drive mechanism defined in claim 7, in which the brake-actuating means includes friction means rotatable relative to the rotatable drive member and frictionally engaged therewith, and cam means connected between said friction means and the connecting means and operated by relative rotation of the rotatable drive member and the rotatable friction brake member to move the connecting means into position for connecting the rotatable drive member and the rotatable friction brake member for conjoint rotation relative to the stationary member.

* * * * *